Dec. 5, 1950     C. A. THOMAS     2,532,827
BRUSH RIGGING
Filed Dec. 3, 1949
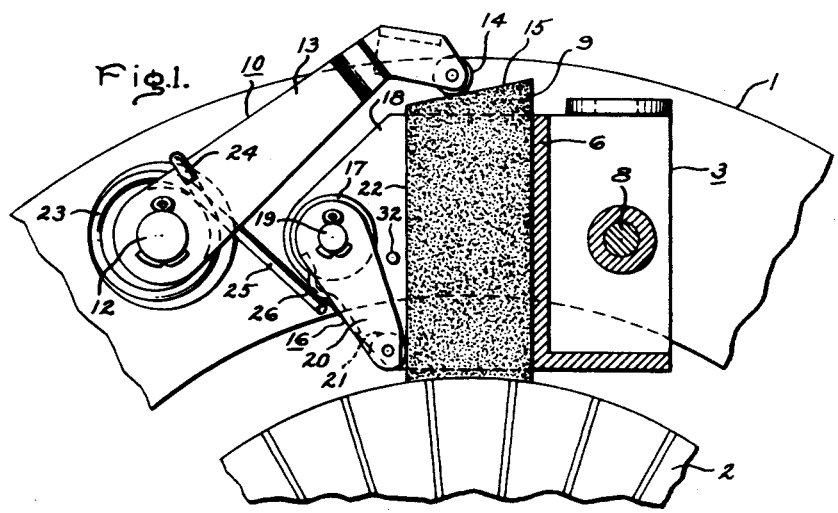
Inventor:
Charles A. Thomas,
by Ernest H. Britton
His Attorney.

Patented Dec. 5, 1950

2,532,827

UNITED STATES PATENT OFFICE 2,532,827

BRUSH RIGGING

Charles A. Thomas, Fort Wayne, Ind., assignor to General Electric Company, a corporation of New York Application December 3, 1949, Serial No. 130,910

6 Claims. (Cl. 171—324)

This invention relates to a brush rigging for dynamoelectric machines and more particularly to a brush rigging adapted to apply both longitudinal and sidewise pressure on the brush for preventing chattering.

In the design of brush rigging for dynamoelectric machines, it is desirable to provide means for preventing chattering of the brush in the brush holder since chattering substantially reduces brush life and produces inferior commutation. Brush chattering can be prevented by supplying means for applying pressure on the side of the brush to urge the brush against a side of the brush holder. It is, however, also desirable to provide brush rigging wherein anti-chatter pressure is applied on the side of the brush and which preserves the same brush fit for both directions of rotation without the use of additional pressure between the brush and the current collector. It is also desirable that the side pressure be a definite fraction of the longitudinal pressure so that the side pressure decreases when the longitudinal pressure decreases.

It is, therefore, an object of this invention to provide an improved brush rigging for dynamoelectric machines.

Another object of this invention is to provide an improved brush rigging for dynamoelectric machines wherein brush chattering is reduced.

A further object of this invention is to provide an improved anti-chatter brush rigging for dynamoelectric machines adaptable for either direction of rotation wherein the side pressure is a function of the longitudinal brush pressure.

Further objects and advantages of this invention will become apparent and this invention will be better understood from the following description referring to the accompanying drawings, and the features of novelty which characterize this invention will be pointed out with particularity in the claims annexed to and forming a part of this specification.

In accordance with one aspect of this invention, there is provided a brush guiding member mounted on a yoke surrounding the commutator of a dynamoelectric machine. The guiding member is provided with two side walls and an end wall forming an open slot for guiding the brush for longitudinal movement toward the commutator. A lever member is pivotally mounted on the yoke and is adapted to engage the end of the brush remote from the commutator. Another lever member is pivotally mounted on the yoke and is adapted to engage the side of the brush remote from the end wall of the guiding member. A spring is provided arranged with its ends engaging both levers for biasing the first lever to resiliently urge the brush toward the commutator and for biasing the second lever to resiliently urge the brush against the end wall of the guiding member for preventing chattering.

In the drawing, Fig. 1 is a side elevational view, partly in section, illustrating an embodiment of this invention; Fig. 2 is a vertical view of the embodiment of Fig. 1; and Fig. 3 is a side elevational view, partly in section illustrating a modification of this invention.

Referring now to Fig. 1, there is shown a stationary brush rigging yoke member 1 surrounding a commutator 2. The yoke member 1 may be secured to the stationary frame of the dynamoelectric machine in any suitable manner and may be arranged for limited rotation to provide for shifting the brushes. A brush guiding member generally identified as 3 is mounted on the yoke member 1 and is formed with side walls 4 and 5 and an end wall 6 defining an open slot 7. The brush guiding member 3 is secured to the yoke member 1 by a suitable stud 8 projecting through side walls 4 and 5. The open slot 7, which is adapted to guide a brush 9 for longitudinal movement toward the current collector 2, has its opening parallel to the axis of the current collector 2.

In order to provide for urging the brush 9 against the current collector 2, a lever member 10 is provided having a hub portion 11 pivotally mounted on the yoke member 1 by a stud 12. The lever member 10 has an arm portion 13 with a roller 14 mounted on the end thereof arranged in engagement with the end 15 of the brush 9 remote from the current collector 2. Arm portion 13 is preferably offset, as best shown in Fig. 2, so that it will bypass lever 16. To provide for the application of sidewise pressure on the brush 9 for the prevention of chattering, another lever member 16 is provided having a hub portion 17 pivotally mounted on an extension 18 of the side 4 of the brush guiding member 3 by a stud 19, which in turn is mounted on the yoke member 1. The lever member 16 has an arm portion 20 having a roller 21 mounted on the end thereof engaging the side 22 of the brush 9 remote from the end wall 6 of the brush guiding member 3. In order to provide for biasing the lever members 10 and 16 to resiliently urge the brush 9 toward the current collector 2 and against the end wall 6 of the brush guiding member 3, a coil spring 23 is arranged on the hub portion 11 of the lever 10 and has an end 24 engaging arm portion 13 of lever 10. The other end 25 of the coil spring 23 is arranged in sliding engagement with a convex surface 26 of the arm portion 20 of the lever member 16. Thus, the spring 20 applies pressure on the levers 10 and 16 to bias the lever 10 so that the brush 9 is resiliently urged toward the current collector 2 and to bias the lever 16 to resiliently urge the brush 9 against the end wall 6 of the brush guiding member 3 to prevent chattering. On larger brushes, as shown in Fig. 1, it has been found desirable to angle the top 15 of the brush by a small amount, for instance, 10° or less, in order to preserve stability of position. However, it will be readily understood that brushes with a flat top surface can be utilized. Stop pin 32 is provided for the arm 20 to limit its travel so as to facilitate the insertion of brushes.

Referring now to Fig. 3 in which like parts are indicated by like reference numerals, a third lever member 27 is provided pivotally mounted on the yoke member 1 in the same axis as the lever member 10 by the stud 12. The lever member 27 has an arm portion 28 having a roller 29 mounted at the end thereof arranged in engagement with a surface 30 of the arm 20 of lever member 16. The spring 23 has one end 24 engaging the arm portion 13 of lever 10 and its other end 31 engaging the arm portion 28 of lever 27. Thus, the spring 23 in the embodiment of Fig. 3 applies pressure on the levers 10 and 27 so that the lever 10 is biased to resiliently urge the brush 9 toward the current collector 2 and the lever 27 is biased to resiliently urge the lever 20 against the side 22 of the brush 9 so that the brush 9 is resiliently urged against the end wall 6 of the brush guiding member 3 for preventing chattering.

It will now be readily apparent that this invention provides an improved brush rigging wherein chatter-preventing side pressure is applied on the side of the brush for both directions of rotation, the side pressure being a fraction of the longitudinal pressure so that the side pressure decreases with a decrease in the longitudinal pressure.

While I have illustrated and described a particular embodiment of this invention, modifications thereof will occur to those skilled in the art. I desire it to be understood, therefore, that this invention is not to be limited to the particular arrangement disclosed, and I intend in the appended claims to cover all modifications which do not depart from the spirit and scope of the invention.

What I claim as new and desire to secure by Letters Patent of the United States is:

1. A brush rigging for a dynamoelectric machine having a current collector comprising a yoke member surrounding said current collector, a brush guiding member mounted on said yoke member having two side walls and an end wall forming an open slot for guiding a brush for longitudinal movement toward said current collector, a lever member pivotally mounted on said yoke member adapted to engage the end of said brush remote from said current collector, a second lever member pivotally mounted on said yoke member adapted to engage the side of said brush remote from said end wall of said brush guiding member, and a third lever member pivotally mounted on said yoke member on the same axis as said first-mentioned lever member adapted to engage said second lever member, and a spring respectively engaging said first-mentioned and said last-mentioned lever members for biasing said first-mentioned lever member to resiliently urge said brush toward said current collector and for biasing said last-mentioned lever member to resiliently urge said second-mentioned lever member against said side of said brush whereby said brush is resiliently urged against said end wall of said brush guiding member for preventing chattering.

2. A brush rigging for a dynamoelectric machine comprising a brush guiding member having an open slot formed therein for guiding a brush for longitudinal movement toward said current collector, a lever member adapted to engage the end of said brush remote from said current collector, a second lever member adapted to engage a side of said brush, a third lever member adapted to engage said second lever member, and a spring having its ends respectively engaging said first-mentioned and said third lever members for biasing said first-mentioned lever member to resiliently urge said brush toward said current collector and for biasing said third lever to resiliently urge said second lever against said side of said brush whereby said brush is resiliently urged against a wall of said brush guiding member slot for preventing chattering.

3. A brush rigging for a dynamoelectric machine having a stationary member comprising a brush guiding member having an open slot formed therein for guiding a brush for longitudinal movement toward a current collector of said dynamoelectric machine, a lever member having a hub portion pivotally mounted on said stationary member of said dynamoelectric machine and an arm portion having a roller arranged on the end thereof adapted to engage the end of said brush remote from said current collector, a second lever member having a hub portion pivotally mounted on said stationary member and an arm portion having a roller arranged on the end thereof adapted to engage a side of said brush, a third lever member having a hub portion pivotally mounted on the same axis as said first-mentioned lever and an arm portion having a roller arranged on the end thereof adapted to engage said arm portion of said second lever member, and a spring arranged on said hub portion of said first-mentioned lever and having its ends respectively engaging said arm portions of said first-mentioned and third lever members for biasing said first-mentioned lever member to resiliently urge said brush toward said current collector and for biasing said third lever to resiliently urge said second lever against said side of said brush whereby said brush is resiliently urged against a wall of said brush guiding member slot for preventing chattering.

4. A brush rigging for a dynamoelectric machine having a stationary member comprising a brush guiding member having an open slot for guiding a brush for longitudinal movement toward a current collector of said dynamoelectric machine, a stud mounted on said stationary member, a lever member pivotally mounted on said stud, a second lever member pivotally mounted on said stationary member, and a coil spring surrounding said stud and connected at its respective ends to said levers and operable in torsion to maintain a uniform ratio of pressures on said levers for biasing said first mentioned lever member to resiliently urge said brush toward said current collector and for biasing said second-mentioned lever member to resiliently urge said brush against a wall of said brush guiding member for preventing chattering.

5. A brush rigging for a dynamoelectric machine having a stationary member comprising a brush guiding member having an open slot for guiding a brush for longitudinal movement toward a current collector of said dynamoelectric machine, a lever member having a hub portion pivotally mounted on said dynamoelectric machine and having an arm portion adapted to engage the outer end of said brush, the outer end of the said brush having a sloping surface, another lever member having a hub portion pivotally mounted on said stationary member and having an arm portion adapted to engage a side of said brush, and a helical spring surrounding the hub portion of said first mentioned lever member and having its ends respectively connected to said lever members and operable in torsion to maintain a uniform ratio of pressures on said lever members for biasing said first-mentioned lever member to resiliently urge said brush toward said current collector and against a wall of said brush guiding member and for biasing said last-mentioned lever member to resiliently urge said brush against a wall of said brush guiding member for preventing chattering.

6. A brush for a dynamoelectric machine having a stationary member comprising a brush guiding member having an open slot for guiding a brush for longitudinal movement toward a current collector of said dynamoelectric machine, a lever member having a hub portion pivotally mounted on said stationary member of said dynamoelectric machine and having an arm portion adapted to engage the end of said brush remote from said current collector, another lever member pivotally mounted on said stationary member having an arm portion adapted to engage a side of said brush, the arm portion of said first-mentioned lever being offset so as to bypass said second-mentioned lever, and a spring member having one end connected to the arm portion of first-mentioned lever member and its other end engaging the arm portion of said second mentioned lever member whereby said spring is operable to maintain a uniform ratio of pressures on said lever members for biasing said first-mentioned lever member to resiliently urge said brush toward said current collector and for biasing said last-mentioned lever member to resiliently urge said brush against a wall of said brush guiding member slot for preventing chattering.

CHARLES A. THOMAS.

REFERENCES CITED

The following references are of record in the file of this patent:

UNITED STATES PATENTS

| Number | Name | Date |
| --- | --- | --- |
| 598,271 | Oehring | Feb. 1, 1898 |
| 708,664 | Richards | Sept. 9, 1902 |
| 732,240 | Underwood | June 30, 1903 |
| 2,265,667 | Mekelburg | Dec. 9, 1941 |